Patented Dec. 12, 1950

2,534,087

UNITED STATES PATENT OFFICE 2,534,087

2,5-DIAMINO-1-THIADIAZINE-3,4 RESINS

Henry A. Walter, Longmeadow, Mass., assignor to Monsanto Chemical Company, St. Louis, Mo., a corporation of Delaware No Drawing. Application October 8, 1949,
Serial No. 120,420

4 Claims. (Cl. 260—67.6)

This invention relates to diazine resins. More particularly, the invention relates to resinous products prepared from 2,5-diamino-1-thiadiazine-3,4 and its derivatives.

This application is a continuation-in-part of my copending application Serial No. 61,915 filed November 24, 1948.

An object of this invention is to provide derivatives of 2,5-diamino-1-thiadiazine-3,4.

An object of this invention is to provide thermosetting resins based on 2,5-diamino-1-thiadiazine-3,4 and its derivatives.

These and other objects are attained by reacting thiosemicarbazide with chloracetamide or an alkyl substituted chloracetamide and then reacting the product with an aldehyde.

The following examples are given in illustration and are not intended as limitations of the scope of this invention. Where parts are mentioned, they are parts by weight.

Example I

A mixture of 100 parts of thiosemicarbazide and 86 parts of chloracetamide was dissolved in a 50-50 solution of ethanol in water. Reaction was rapid at a temperature of about 70° C. and a precipitate was formed. The precipitate was recovered by filtration and was then treated with hot aqueous sodium bicarbonate. On cooling, a crystalline product in the shape of fine needles was obtained. The crystals had a melting point of over 250° C. The crystals were identified as 2,5-diamino-1-thiadiazine-3,4.

Example II

A solution of 100 parts of thiosemicarbazide in aqueous ethanol was mixed with a solution of 100 parts of α-chloropropionamide in aqueous ethanol. On mixing the two solutions, rapid reaction was observed and a precipitate developed. The precipitate was recovered by filtration and dissolved in hot aqueous sodium bicarbonate. On cooling, fine needle-like crystals developed which were identified as 2,5-diamino-6-methyl-1-thiadiazine-3,4.

The resins of this invention are derived from compounds having the following structural formula:

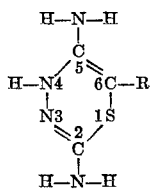

wherein R may be hydrogen, alkyl or aryl.

As described and claimed in my co-pending application Serial No. 61,915 filed November 24, 1948, diamino-thiadiazines are prepared by reacting thiosemicarbazide with a compound having the formula R—CHCl—CONH$_2$ wherein R may be hydrogen, alkyl or aryl. Thus, when R is hydrogen, the compound is chloracetamide, when R is methyl the compound is α-chloropropionamide, when R is phenyl the compound is α-phenyl-α-chloracetamide. The compounds may be named from the acid from which they are derived or as substitution products of acetamide. Thus, α-chloropropionamide may also be called α-methyl-α-chloracetamide and α-phenyl-α-chloracetamide may be called α-chlorobenzamide. It is preferred to use approximately equimolar quantities of the two reactants since a large excess of either component tends to produce undesirable by-products in substantial amounts.

The reaction between thiosemicarbazide and the chloracetamides may be easily carried out at temperatures ranging from 50° C. to 100° C. although higher temperatures may be used if desired. The reaction is conveniently carried out in ethanol-water solutions, especially since the products are insoluble therein and may be easily recovered by a simple filtration process. The precipitate must then be treated with hot sodium bicarbonate to obtain the free base. Other compounds than sodium bicarbonate may be used including sodium hydroxide, sodium carbonate, potassium carbonate, etc.

The compounds of this invention are particularly useful for the preparation of thermosetting molding powders and coating resins. The resins are prepared by reacting the thiadiazines with aldehydes, especially formaldehyde under alkaline conditions with or without further modification with an alcohol.

Example III

A mixture of 1 mol of 2,5-diamino-1-thiadiazine-3,4 with 2 mols of formaldehyde was heated at reflux temperature and atmospheric pressure at a pH of about 8 to 9 for about 1 hour. The product was an aqueous suspension of a light brown, fusible resin. The resin could be recovered by dehydration and molded with or without conventional additives such as fillers, pigments, dyes, lubricants, etc. The resin would be cured to the infusible state by heating at from 100° C. to 200° C. The time necessary to effect a complete cure could be shortened by the use of acidic curing catalysts.

If it is desired to prepare a coating resin, the thiadiazines may be reacted with an aldehyde and an alcohol. Any alcohol may be used such as methanol, ethanol, butanol, stearyl alcohol, cetyl alcohol, benzyl alcohol, cyclohexanol, etc. All three ingredients may be reacted together at one time under alkaline conditions, or the thiadiazine and aldehyde may be reacted together under alkaline conditions, and the product reacted with the alcohol under acid conditions.

*Example IV*

A mixture of 1 mol of 2,5-diamino-1-thiadiazine-3,4 with 2 mols of formaldehyde was heated at reflux temperature and atmospheric pressure at a pH of about 8 to 9 for about 1 hour. The reaction mixture was then acidified to a pH of 5 to 7 and 4 mols of n-butanol were added. The resultant mixture was heated at reflux temperature and atmospheric pressure for about 30 minutes following which the excess butanol and water were removed by azeotropic distillation. Dry butanol was returned to the reaction vessel until a substantially anhydrous butanol solution of the dibutyl ether of dimethylol 2,5-diamino-1-thiadiazine-3,4 was obtained. The solution could be used without modification as a coating and impregnating composition which after removal of the solvent could be cured to an insoluble infusible state by the application of heat.

The product of Example IV could be modified by adding hydrocarbon solvents such as benzene or xylene. It could be used as modifier for other coating and impregnating resins such as alkyd resins, phenolic resins and melamine resins. Coatings prepared from mixtures of the alcohol modified resin and alkyd resin have high gloss, excellent alkali-resistance and resistance to ageing.

It is obvious that many variations may be made in the products and processes of this invention without departing from the spirit and scope thereof as defined in the appended claims.

What is claimed is:

1. A resinous condensation product of formaldehyde and a compound having the formula:

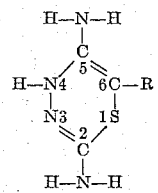

wherein R is taken from the group consisting hydrogen, alkyl and aryl radicals.

2. A resinous condensation product as in claim 1 wherein R is hydrogen.

3. A resinous condensation product of formaldehyde, an alcohol and a compound having the formula:

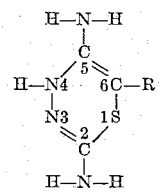

wherein R is taken from the group consisting of hydrogen, alkyl and aryl radicals.

4. A resinous condensation product as in claim 3 wherein R is hydrogen and the alcohol is n-butanol.

HENRY A. WALTER.

No references cited.